Jan. 29, 1929.

B. M. SHIPLEY 1,700,182

CASH REGISTER

Original Filed Jan. 2, 1923    5 Sheets-Sheet 1

FIG. 1

Inventor
Bernis M. Shipley
By Earl Beust
Henry Stauffer
His Attorneys

Jan. 29, 1929.

B. M. SHIPLEY 1,700,182

CASH REGISTER

Original Filed Jan. 2, 1923    5 Sheets-Sheet 2

FIG. 2

Inventor
Bernis M. Shipley
By Hearl Beust
Henry E Stauffer
His Attorneys

Jan. 29, 1929.

B. M. SHIPLEY 1,700,182

CASH REGISTER

Original Filed Jan. 2, 1923   5 Sheets-Sheet 3

FIG. 3

Inventor
Bernis M. Shipley
By
His Attorneys

Jan. 29, 1929.

B. M. SHIPLEY

1,700,182

CASH REGISTER

Original Filed Jan. 2, 1923   5 Sheets-Sheet 4

Inventor
Bernis M. Shipley
By Earl Beust
Henry E Stauffer
His Attorneys

Patented Jan. 29, 1929.

1,700,182

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Original application filed January 2, 1923, Serial No. 610,273. Divided and this application filed October 31, 1925. Serial No. 66,055.

This invention relates to cash registers and the like, and has more particular relation to the type of machine shown and described in Letters Patents of the United States, No. 1,230,864, issued to W. A. Chryst, on June 26, 1917; No. 1,242,170 and No. 1,394,256, issued to F. L. Fuller, on October 9, 1917 and October 18, 1921, respectively; and Letters Patent of the United States No. 1,619,796, issued to Bernis M. Shipley March 1, 1927. This application is a division of application for Letters Patent of the United States, Serial No. 610,273, filed January 2, 1923, and that application should also be referred to for a complete understanding of the present invention.

It is desirable in savings banks and similar institutions wherein deposits and withdrawals are made, or like transactions effected, to provide an accounting machine having means with which to add and subtract amounts set up on the keyboard of the machine, and to enter such amounts, not alone in totalizers selected by the respective operators of the machine, whereby the transactions of each operator are segregated from the rest, which necessitates that each operator be provided with a separate totalizer for each class of items handled, but also to accumulate grand totals of all of the items belonging to each class of transaction handled by all of the operators.

Thus, assuming a machine equipped with my invention to be located in a savings bank, for use in handling the two classes of transactions, deposits and withdrawals, and that such machine is to be operated by three tellers.

It would require the provision of two totalizers for each teller, one to register deposits and the other to register withdrawals, making a total of six totalizers, and in addition, there should be two grand totalizers, one accumulating the deposit amounts handled by all three tellers and the other to accumulate the withdrawal amounts handled by all three tellers.

Obviously it would economize time and labor if the machine was so arranged that each teller by the selection and operation of one or the other of his special keys to bring his particular "deposit" or "withdrawal" totalizer into operation, could also, and by the same act, select for operation the appropriate "deposit" or "withdrawal" grand totalizer, depending upon the nature of the transaction.

One of the objects of this invention, therefore, is to enable the operator of a multiple totalizer machine, to select a special totalizer and a grand totalizer by actuation in one direction of a single manipulative control means.

Another object is the provision of means to enable any of several operators of the machine having totalizer selection keys assigned to the individual operators only, to select their individual totalizers and by the same act, to select a grand totalizer appropriate to the particular class of transaction to be entered on the individual totalizer.

With these and incidental objects in view, the invention consists of certain novel features of construction and combinations of parts, the essential elements of which are set forth in appended claims, and a preferred form or embodiment of which is hereinafter described with reference to the drawings which accompany and form part of this specification.

General description.

Described in general terms, the machine embodying the present invention is one which is particularly suited for use by tellers in savings banks or similar institutions.

In institutions of this type, the principal transactions handled by the tellers consist of entering either withdrawals or deposits, and it is, therefore, the principal function of the present machine to take care of such transactions.

If, for instance, a customer desires to make a deposit, the teller first withdraws the customer's account card from his file, and sets up on the keyboard the customer's account number, together with the amount of the customer's old balance, as shown by the card. The machine is operated, and the old balance is entered upon an adding and subtracting totalizer. It is also printed upon the detail strip, customer's account card and his pass book. The amount of the deposit is then set up upon the keyboard, the deposit key assigned to the particular teller operating the machine at that time, is depressed and the machine released, whereupon the amount of the deposit is added to the amount of the old balance, which has previously been entered on the adding and subtracting totalizer. The total lever is then moved to the balance position and the machine released, whereupon the total of the old balance and the deposit, which forms the new balance, will be printed upon the detail strip, customer's card and pass book, and at the same time, the adding and subtracting totalizer will be returned to zero. The depression of the deposit key controls the selection of a totalizer, which will also receive the amount of the deposit, and another totalizer is automatically selected which receives the totals of the deposits of all of the tellers.

Practically the same procedure is carried out when the customer desires to make a withdrawal. In this case the old balance is first entered upon the adding and subtracting totalizer and printed as above described. The amount of the withdrawal is then set up on the keyboard and the withdrawal key corresponding to the teller handling the transaction is depressed. When the machine is operated, the amount of the withdrawal is subtracted from the amount of the old balance standing on the adding and subtracting totalizer. Then when the total lever is moved to the balance position, and the machine operated, the new balance will be printed, as above described, and the adding and subtracting totalizer returned to zero. The withdrawal key also controls the totalizer, which accumulates all the withdrawals of that particular teller and the withdrawal key automatically selects another totalizer in which the total withdrawals handled by all the tellers are accumulated.

Operating mechanism.

The machine is operated by either an electric motor or a crank in the usual manner, and it is thought to be unnecessary, in view of the patents and applications above referred to, to include any description of the operating mechanism in this application. It is thought to be sufficient to state that the operating mechanism drives a main drive shaft 77, which in turn, operates the mechanism of the machine.

Amount keys.

Figure 1:
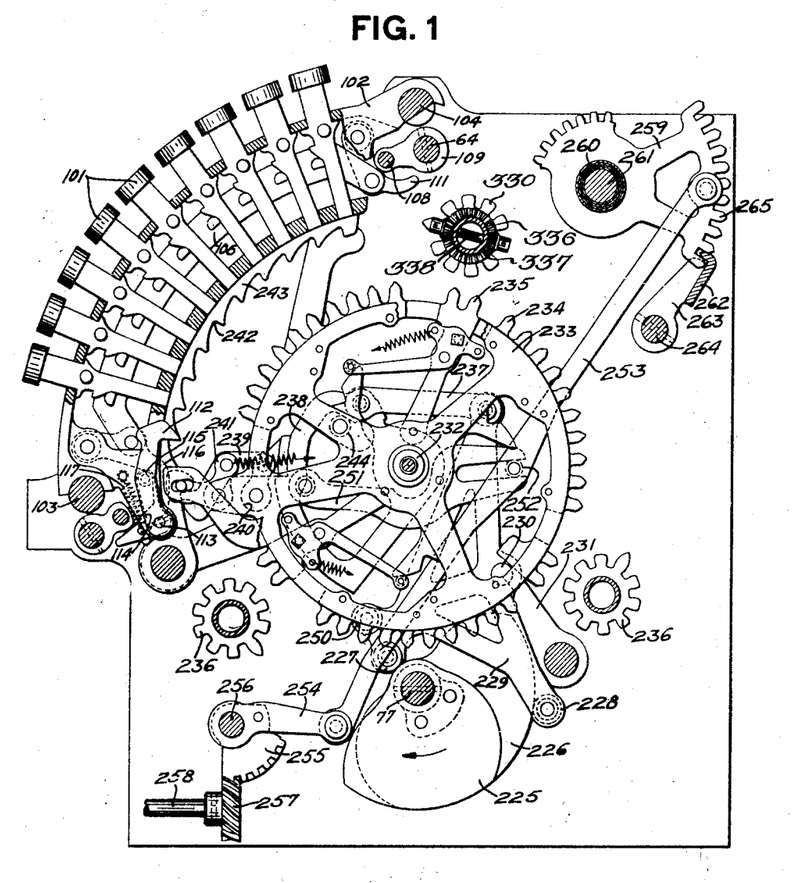
Fig. 1 is a sectional view in right elevation of one of the amount banks.

Any number of banks of amount keys may be provided in the present machine, depending on the capacity desired. These amount banks are identically the same as the amount banks shown and described in the above patents and applications, and therefore but a brief description thereof will be given herein. The amount banks are all duplicates of each other, and Fig. 1 shows one complete bank. Keys 101 are slidably mounted in key frames 102, supported at their lower ends upon a rod 103, and at their upper ends upon a rod 104. Each of these keys cooperates with a detent bar 105, and a locking plate (not shown), and is held in its normal outer position by means of a spring in the usual manner. Each of these keys has a shoulder, which when the key is depressed, contacts with a corresponding pin on the detent 105, thereby rocking the detent downwardly until the shoulder on the key has passed the pin on the detent, whereupon the detent will move upward far enough to prevent the key from returning to its normal outer position. The keys are released near the end of the operation of the machine by means of a rod 108, which is carried by a plurality of arms 109, fast on a release shaft 64. The rod 108 cooperates with a tail 111 of the link supporting the upper end of the detent bar 105, and when the shaft 64 is rocked counter-clockwise by means to be later described near the end of the operation, the detent bar will be moved downwardly far enough to permit the shoulders of the keys to pass the pins carried by the detent bar, and thereby be restored to their normal positions.

Cooperating with each bank of amount keys is a zero stop pawl 112, (Fig. 1) the function of which will be described later. These pawls are fast on short shafts 113, mounted in the key banks. These shafts 113 also carry arms 114, which in turn support pins 115, engaged by hooked links 116, pivoted to the key banks, and also pivotally connected to the lower ends of the detents 105. The zero stop pawl 112 is normally in the position shown in Fig. 1, but when a key 101 is depressed, the lowering of the detent bar 105 rocks the hooked link 116 clockwise, which through pin 115, arm 114 and shaft 113, rocks the zero stop pawl 112 counter-clockwise to its ineffective position. The zero stop pawl is normally maintained in its effective position by means of a spring 117, extending between a pin on a projection of arm 114 and a pin on the key bank.

Withdrawal and deposit banks.

Figure 2:
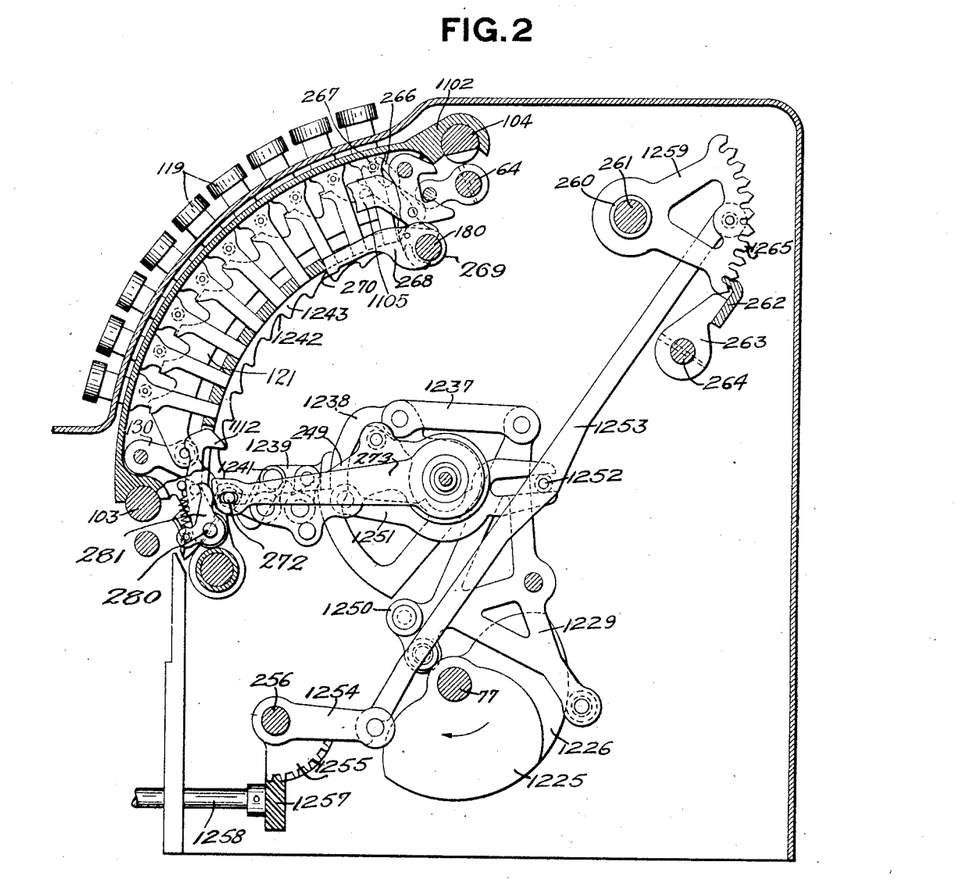
Fig. 2 is a sectional view in right elevation of the deposit bank.

To the right of the amount keys 101 there is a bank of keys which will be called herein the "withdrawal keys". The next bank to the right will be known as the "deposit keys". As these two banks are, with a few exceptions which will be hereinafter pointed out, duplicates of each other, the deposit bank only is shown herein (Fig. 2).

The deposit keys 119 are mounted in a key bank 1102 similar to the key bank 102 for the amount keys, and supported on the rods 103 and 104 before described. The keys 119 carry shoulders cooperating with pins carried by a detent bar 1105, which holds the keys in depressed positions, as described in connection with the amount keys. These keys 119 are released near the end of an operation by the same mechanism which releases the said amount keys.

The deposit bank of keys is equipped with a zero stop pawl 1112, and the withdrawal bank of keys (not shown) is provided with a similar pawl, which pawls are identically the same as the pawl 112 previously described in connection with the amount bank.

Balance bank.

Figure 3:
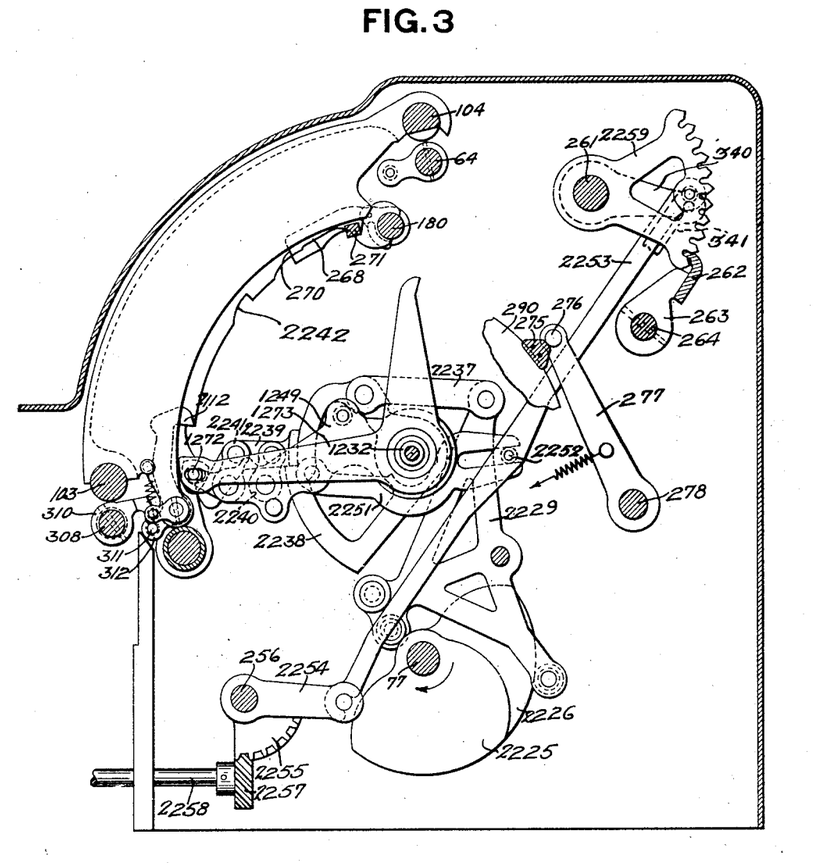
Fig. 3 is a sectional view in right elevation of the balance bank.

There are no keys in the balance bank (Fig. 3). The differential mechanism for this bank is controlled by other means which will be fully described.

Total lever.

Figure 4:
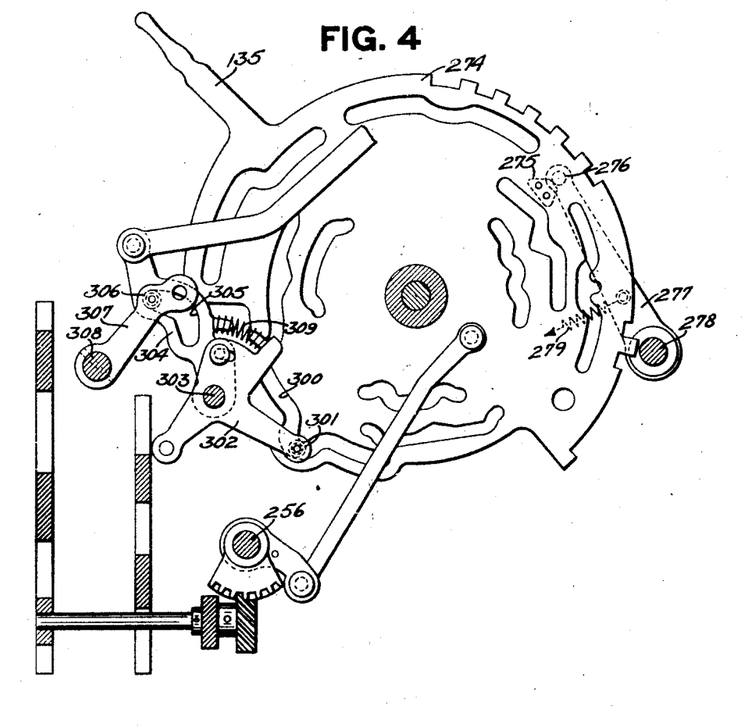
Fig. 4 is a detail view of the total lever plate and a portion of the mechanism which cooperates therewith.

Next to the balance bank is the total lever 135 (Fig. 4). This lever controls the machine on total and sub-total printing operations in a manner well-known in the art, and fully shown and described in the before mentioned patents and applications.

Differential mechanism.

The differential mechanism of the machine is employed differentially to operate the different totalizers and to select them for operation, and also to set type carriers in the printing mechanism as controlled by the banks of amount keys. The amount differential mechanism will be described first.

Amount differential unit.

There is one complete differential unit for each amount bank, but as they are all identical in construction and operation, only one will be described.

To drive the differential mechanism or the amount banks, the drive shaft 77 is provided with a plurality of pairs of cams 225 and 226, (Fig. 1) each pair cooperating with rollers 227 and 228, respectively, carried by Y shaped levers 229, of which there is one for each bank of amount keys in the machine. Each of these levers 229 is pivoted at 230 on a corresponding frame 231. Loosely mounted on hollow studs 232, carried by the frames 231, which support the differential units cooperating with the amount banks, are differentially movable members 233, carrying racks 234 and transfer arms 235, for operating the totalizer pinions 236.

The levers 229 at the end of their upwardly extending arms, are pivotally connected by links 237 to driving segments 238, loose on the studs 232. The driving segments 238 adjacent to the banks of amount keys, are connected to the differentially movable members 233 by latches 239, each of which is supported by an arm 240 and a bell crank lever 241, pivoted on the corresponding differentially movable member. Springs hold the rear ends of the latches 239 in engagement with shoulders on the driving segments 238. When the segments are driven by their cams 225 and 226, the differentially movable members 233 are carried with their latches 239 up to points where the forwardly extending arms of the bell crank levers 241 contact the inner ends of the depressed amount keys. Such contact results in disengagement of the latches from the driving segments and engagement of the forward ends of the latches with the particular one of a series of notches 242, formed in a serrated bar 243, supported by the frame 231, which is opposite the latch when it is disconnected from its driving segment 238. Upon return movement of the driving segment to normal position, a pin 244, mounted on the differentially movable member 233, is engaged by the inside of the driving segment, and said member is returned thereby to its normal position. If a key is not depressed in an amount bank, the zero stop pawl 112 for that particular amount bank, operates the latch 239 in the manner set forth in the parent application, to arrest the differentially movable member in its zero position. When a key is depressed, however, the zero stop pawl is moved out of its operating position, as above described.

Differential mechanism for the deposit bank.

As the deposit and withdrawal banks serve to select totalizers, but not to accumulate thereon, no differentially movable racks are used in connection with these banks. With the exception of this fact, however, the differential mechanism for these banks is identical with that shown and described with relation to the amount bank.

It can be seen from Fig. 2 that there are two cams 1225 and 1226, which drive a Y shaped lever 1229, which is in turn connected by a link 1237 to a driving segment 1238.

This driving segment 1238 cooperates with a differentially movable member 249, which in turn carries a latch 1239, identical with latch 239 for the amount bank. When the cams 1225 and 1226 are rotated, the segment 1238, through link 1237 and Y shaped lever 1229, will raise the differentially movable member 249, due to the engagement of the latch 1239 with a shoulder on said driving segment, until the outer end of the lever 1241 comes in contact with whichever one of the keys in these banks is depressed. When this occurs, the latch 1239 will be moved forwardly out of engagement with the shoulder and the forward end of said latch will engage with one of a plurality of notches 1242 in a serrated bar 1243. If no key in the deposit bank or withdrawal bank (not shown) is depressed, the zero stop pawls 1112 for these banks will be engaged by the ends of levers 273 slotted to receive pins 272 on the bell crank levers 1241 (see Fig. 3), and disconnect the latches 1239 for these banks in the zero position, as in the amount banks. If a key in one of these banks has been depressed, the corresponding zero stop pawl for that bank will be rendered inoperative.

Appropriate to each amount differential mechanism is a beam 251, pivoted at one end to the differentially movable member 233, and bifurcated at its opposite end to straddle a stud 252, carried by a link 253. The beam 251 is operated by a roller 250, carried by the Y shaped lever 229. At its lower end, this link is pivoted to an arm 254, fast to a spiral segment 255, loose on a rod 256 supported by the machine side frames. These spiral segments 255 mesh with spiral gears 257, fast on the inner ends of shafts 258, which through mechanism not shown or described herein, set up the appropriate type wheels for printing the amount on the various record retaining means.

At their upper ends, the links 253 are pivoted to segments 259, fast on sleeves 260, which are supported by a shaft 261. An alining plate 262 carried by a plurality of arms 263, fast on a shaft 264, is adapted normally to engage with teeth 265, formed on the segments 259. When the differential mechanism is operated, the aliner 262 will be moved out of engagement with the teeth 265, and when the differential movement is complete, it will be again moved into engagement therewith, to properly aline and hold the various mechanisms set up by the differential mechanism in their set positions.

Associated with the differential mechanism for the deposit bank of keys (Fig. 2) is a beam 1251 pivotally connected at one end to the differentially movable member 249. The beam 1251 is bifurcated at its opposite end to straddle a stud 1252 on a link 1253 pivoted at its lower end to an arm 1254 loosely mounted on the shaft 256. A spiral segmental gear 1255, also journaled on the shaft 256, is fast to the arm 1254 and meshes with a spiral pinion 1257 fast on the end of a shaft 1258. The shaft 1258 extends into the printer and, by means of mechanism not shown herein, sets up type wheels (also not shown) for printing purposes.

The link 1253 is connected at its upper end to a toothed segment 1259 fast on a particular one of the sleeves 260 on the shaft 261. The aligner 262 also co-operates with the segment 1259 to insure the proper positioning of the parts and to lock them where adjusted.

A roller 1250 on the Y-shaped lever 1229 cooperates with the beam 1251.

The means for operating the aliner 262 is old and well known in the art, and it is not, therefore, either shown or described herein.

Adding and subtracting totalizer.

The machine to which the present invention is adapted to be applied, is provided with an adding and subtracting totalizer, such as is shown in Fig. 17 of applicant's co-pending application, Serial No. 610,273. This same type of totalizer is also illustrated and described in the patent to Fuller, No. 1,242,170.

A brief description of this totalizer will now be given.

Figure 7:
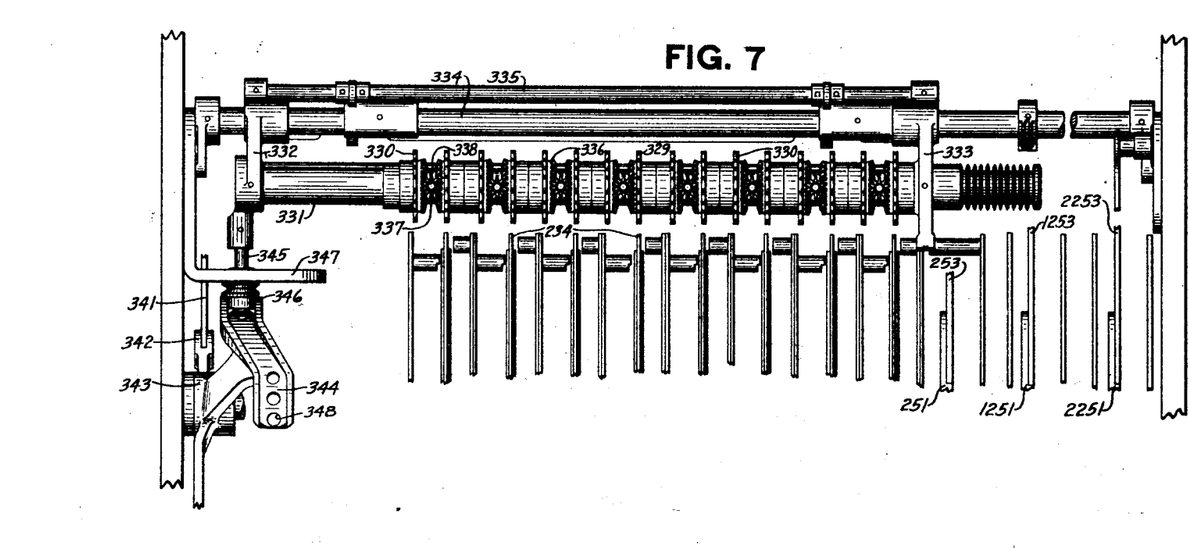
Fig. 7 is a front elevation of the adding and subtracting totalizer.

The adding and subtracting totalizer illustrated in Fig. 7 includes a plurality of pairs of totalizer wheels 329 and 330 rotatably mounted on a tube 331. Two brackets 332 and 333 support the tube 331 on a shaft 334, the ends of which shaft traverse guide slots (not shown) in plates attached to the side frames of the machine. A rod 335 connects the brackets 332 and 333, and with the tube 331, forms a totalizer frame slidable longitudinally on the shaft 334 for the purpose of selecting which of the sets of totalizer wheels 329 or 330 are to be engaged with the actuator racks 234.

The adding and subtracting totalizer wheels 329 and 330 are interspersed in manner well known in the art, so that the corresponding denominational wheels of each set of totalizers are arranged in pairs.

Bevel gears 336 are fast to the adjacent sides of each pair of totalizer wheels 329 and 330. A small beveled pinion 337 mounted on a rod 338 supported in the tube 331, meshes with both of the beveled gears 336 for each pair of totalizer wheels 329 and 330 in such a manner that when one of the wheels 329 or 330 is rotated in one direction, its mate is rotated an equal distance in the opposite direction.

Balance bank differential.

The differential mechanism which cooperates with the balance keys is identically the same as the differential mechanism for the deposit and withdrawal banks, with one exception which will be hereinafter mentioned.

The differential mechanism for this bank is for positioning the adding and subtracting totalizer so that either the adding pinions 330 or the subtracting pinions 329 thereof will be in alinement with the differentially movable racks 234 of the amount differential mechanism. There are no keys for disconnecting the latch of the differential mechanism appropriate to this bank, as there are in the other banks of the machine. The latch is disconnected under the control of certain keys in the deposit and withdrawal banks on adding or subtracting operations, and under control of the total lever on totalizing operations.

This differential mechanism includes a differentially movable arm 1249 (Fig. 3) pivotally supported on a stud 1232 mounted in stationary frame plates similar to the plates 231 (Fig. 1) which support the studs 232 for the amount banks. A latch 2239 pivotally supported on the arm 1249 by means of a link 2240 and a bell crank lever 2241, connects the differentially movable arm 1249 with a driving segment 2238. A link 2237 connects the driving segment 2238 to the upper end of a driving lever 2229 which is rocked by a pair of cams 2225 and 2226. These cams make one complete rotation in a clockwise direction at each operation of the machine to rock the driving lever 2229 first clockwise from normal position, and then counter-clockwise to normal position. This movement of the driving lever 2229 is transmitted to the driving segment 2238 through the link 2237, to rock the segment first clockwise, and then back to normal. On its clockwise travel, the segment 2238 carries the latch 2239 and consequently the differentially movable arm 1249 therewith, until the forward end of the bell crank lever 2241 is rocked counter-clockwise about its pivot on the arm 1249, by one of several means to be later described.

Since no keys are assembled in the balance bank (Fig. 3) other means must be provided for disconnecting the latch 2239 from the driving segment 2238 in the several positions to which it may be adjusted.

One of the means provided for this purpose includes an angular lever 1273 pivoted on the stud 1232. A slot in the forward arm of the angular lever surrounds a stud 1272 in the bell crank lever 2241. The forward end of the angular lever lies in the plane of the zero stop 2112, and during an operation of the machine wherein the stop 2112 remains in effective position, as shown in Fig. 3, that is, when it has not been rocked to its ineffective position by the depression of a deposit key 119, the forward end of the angular lever 1273 on its clockwise travel, contacts the zero stop 2112 and rocks the bell crank lever 2241 counter-clockwise to disconnect the latch 2239 from the driving segment 2238.

Similarly, the upwardly extending arm of the angular lever 1273 disconnects the latch 2239 from the driving segment 2238 in the "total" or "fifth" position, on its upward travel, by striking the pin 276 which is moved into the path thereof by the spring when the total control lever 135 is adjusted from its adding position to any of its several total and sub-total taking positions.

When the bell crank lever 2241 is rocked counter-clockwise, the latch 2239 is disconnected from the segment 2238 and at the same time, the forward end of said latch moves into engagement with a particular notch 2242 in a serrated bar 2243, depending upon which of the several means is employed to rock the bell crank lever 2241 to disconnect the latch.

The driving segment 2238 then continues its regular excursion and when, on its return movement, the shoulder on the segment arrives opposite the foot of the latch 2239, a spring (not shown) withdraws the latch from the notch 2242 in the serrated bar 2243 and engages it behind the shoulder on the segment 2238. The segment 2238 continues its return travel to home position, and carries the latch and differentially movable arm 1249 therewith.

A beam 2251 pivoted at one end to the differentially movable arm 1249, is bifurcated at its opposite end to straddle a stud 2252 in a link 2253. This link is pivoted at its lower end to an arm 2254 journaled on the shaft 256. A segmental spiral gear 2255 secured to an arm 2254 also journaled on the shaft 256, meshes with a spiral pinion 2257 pinned on one end of a shaft 2258. This shaft extends into the printing mechanism (not shown), for the purpose of adjusting the type wheels.

The link 2253 is pivoted at its upper end to a toothed segment 2259 secured to the shaft 261. The aliner 262 co-operates with the toothed segment 2259 to align the segments and the mechanism associated therewith in adjusted position.

A link 341 (Figs. 3 and 7) depending from an arm 340 (Fig. 3) fast to the shaft 261 near the left side frame of the machine is pivoted to an arm 342 (Fig. 7) extending rearwardly from a hub 343 which also supports a drum cam 344, the purpose of which is to slide the adding and subtracting totalizer longitudinally in the machine to select either the set of adding wheels 330 or the set of subtracting wheels 329 for operation.

A rod 345 fast in the bracket 332, carries an anti-friction roller 346 which fits within the channel of the drum cam 344. A bracket 347 secured to the left side frame of the machine guides the roller 346 and the rod 345 in their longitudinal movement as the totalizers are shifted axially, to prevent the totalizer frame from turning about the shaft 334.

The adding and subtracting totalizer is normally in a position wherein the subtracting wheels 329 (Fig. 7) lie opposite the actuator racks 234.

When the differentially movable arm 1249 (Fig. 3) swings upwardly, as above described, the end of the beam 2251 pivoted thereto is carried therewith. Shortly after the commencement of this movement, the upper edge of the beam contacts with the stud 1232, which forms a fulcrum for the beam, whereby continued upward movement of the differential arm 1249 lowers the link 1253. This movement of the link 2253 rocks the toothed segment 2259, shaft 261 and arm 340 (Fig. 3) in a clockwise direction, the aligner being disabled, which movement serves to lower the link 341 (Figs. 3 and 7) to rotate the drum cam 344. Due to the angular configuration of the cam groove it will, when moved to a position wherein any one of the three apertures 348 in the lower part thereof is opposite the rod 345, slide the adding and subtracting totalizer to the right, as viewed in Fig. 7, to bring the adding wheels 330 into co-operative relation with the actuator racks 234. The holes 348 are for the purpose of accommodating the end of the rod 345 when the totalizer is moved into engagement with the actuator racks 234 by means not herein disclosed.

The angular portion of the drum cam 344 (Fig. 7) is provided in order to shift the adding and subtracting totalized to select either the adding wheels or the subtracting wheels for engagement with the totalizer actuators 234. Therefore, only two positions of the cam, and consequently, of the differentially movable arm 1249 (Fig. 3) are necessary to select the adding wheels and the subtracting wheels. However, the balance bank differential mechanism (Fig. 3) which positions the drum cam 344 (Fig. 7) sets up type wheels (not shown) and selects columns in which the imprint is to be made, by means of the shaft 2258, and since it is desired to print several different characters, and to print in different columns, it is necessary to provide means for disconnecting the latch 2239 of this bank from its driving segment 2238 in a corresponding number of positions. Only one of these positions, the zero position, selects the subtracting wheels 329. The upper three positions, that is, the positions corresponding with the positions of the "5", "7" and "9" keys of an amount bank, all select the adding wheels 330 and set the type wheels to print corresponding characters.

The adding and subtracting totalizer is normally so positioned that the subtracting pinions 329 thereof are in position to cooperate with the actuators 234. It can be seen, therefore, that if an operation which involves subtraction is to be performed, such as a withdrawal operation, the totalizer need not be moved, and it is, therefore, necessary to provide means to disconnect the latch 2239 of the balance bank differential, which selects the position for the adding and subtracting totalizer, in the zero position. If, however, a transaction involves addition, it is necessary to disable the means for disconnecting the latch of the balance bank differential in its zero position, and to provide means for disconnecting this latch in the positions appropriate to the character of the transaction, which will, in all cases, not involving withdrawals, move the adding and subtracting totalizer to the adding position.

Taking for example, an operation which involves the making of a deposit, the operator first depresses the old balance key, which is the uppermost key in the bank shown in Fig. 2. The depression of this key automatically controls mechanism for the purpose of disconnecting the latch 2239 of the balance bank differential in the seventh position. The mechanism for disconnecting the latch in this position consists of a bifurcated arm 266 (Figs. 2 and 5) loose on a shaft 180. The bifurcated end of arm 266 straddles a pin 267, carried by the shank of the old balance key in the deposit bank. The arm 266 is connected with another arm 268 by a yoke 269. It can be seen from Fig. 2 that when the old balance key is depressed, pin 267 will rock the arm 266 counter-clockwise and through the yoke 269, will rock the arm 268 to the same extent, which will position the end 270 of this arm in the path of movement of the lever 241, appropriate to the balance bank. Therefore, when the lever 241 comes into contact with the end 270 of the arm 268, the latch 2239 will be disconnected from its driving segment 2238. The disconnection of the latch at this point positions the adding elements 330 of the adding and subtracting totalizer to receive the amount of the customer's old balance. In this position also, the corresponding type wheel (not shown) is positioned to print a character symbolic of the transaction just completed.

The amount of the deposit is then set up on the amount keys 101, and a deposit key 119 is depressed. Then when the machine is operated, the differential mechanism for the balance bank moves to the "ninth" position, as the zero stop pawl 2112 has been moved to ineffective position by the depression of the deposit key, and there are no other obstructions in its path. When the latch 2239 reaches the "ninth" position, it is disconnected from its driving segment 2238 by contact with a flat stud 271 on what would normally be the key frame. The disconnection of the latch in the "ninth" or deposit position causes the adding and subtracting totalizer to be positioned with the adding wheels 330 in cooperative relation with the actuators 234, so that the amount of the deposit will be added on the adding elements of this totalizer.

Disconnection of the latch in this position also causes the type wheels (not shown) to be positioned to print the character indicating that a "deposit" transaction has been made.

It is now desired to print the new balance, which is the total of the old balance and the deposit. The total lever 135 (Fig. 4) is moved downwardly to the first position below its adding position, which rotates the plate 274 integral therewith in a counter-clockwise direction, as viewed in Fig. 4. The movement of the total lever automatically renders the zero stop pawl 2112 for the balance bank ineffective, as will be hereinafter described, and therefore, the differential mechanism for this bank will move upwardly. The control plate 274 carries riveted thereto a lug 275, which when the total lever is in its adding position, is in contact with a pin 276 carried by an arm 277 loose on a shaft 278 supported by the machine side frames. The pin 276 extends over into the plane of the stationary supporting frame 290 (Fig. 3) for the differential mechanism of the "balance" bank. This arm constantly tends to rock in a counter-clockwise direction due to a spring 279 fast thereto. It can be seen from Fig. 4 that when the total lever control plate 274 is moved downwardly one space to the balance position, the lug 275 will be moved out from under the pin 276 and will permit the pin to rest on the periphery of the differential supporting frame 290 (Fig. 3), shown broken away. Then when the differentially movable member 1249 of the balance bank moves upward, carrying with it the forwardly extending arm of bell crank 1273, the upwardly extending arm of the bell crank will contact the pin 276 (Fig. 3), and through the forwardly extending arm of the bell crank and pin 1272 will disconnect the latch 2239 in the "5" position. The disconnection of the latch in this position will position the adding and subtracting totalizer, so that the adding elements 330 thereof are in cooperative relation with the actuators 234, and therefore, the actuators are moved under control of the adding elements in a manner well known in the art, to set up and print the new balance, which is on the adding and subtracting totalizer. Movement of the differential mechanism of the balance bank to the "5" position sets up the type wheels (not shown) to a position to print a character indicating that the new balance has been taken.

Figures 5, 6:
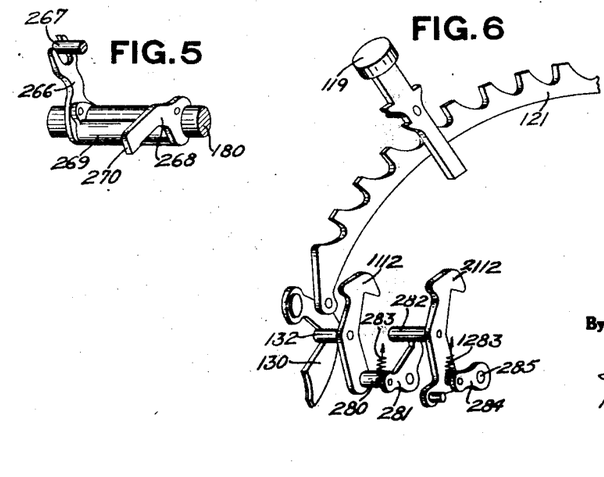
Fig. 5 is a detail view of the means for breaking the latch in the balance bank under control of the old balance key in the deposit bank.
Fig. 6 is a detail perspective view of the means for disabling the zero stop pawl in the balance bank by the depression of a key in the deposit bank.

Mechanism for moving the zero stop pawl 2112 of the balance bank to its ineffective position when it is desired to add on the adding wheels 330 of the adding and subtracting totalizer, will now be described. It will be remembered that when any key 119, (Fig. 2) in the deposit bank is depressed, the moving of the key detent 121 for this bank, will rock a link 130 clockwise, as shown in Fig. 6. This link 130 cooperates with a pin 132, carried by the zero stop pawl 1112 for the deposit bank, and will rock this zero stop pawl counter-clockwise to its ineffective position.

The zero stop pawl for the deposit bank is fast on a short shaft 280, which also carries a lever 281 adapted to cooperate with a pin 282 mounted on the zero stop pawl 2112 for the balance bank, as is best shown in Fig. 6. It is clear, therefore, that when the zero stop pawl 1112 for the deposit bank is rocked counter-clockwise to its ineffective position, as above described, the lever 281 will contact with the pin 282 and simultaneously rock the zero stop pawl 2112 for the balance bank to its ineffective position, thus permitting the differential movable member 1249 for this bank to move upward with its driving segment 2238 until disconnected in one of the three adding positions.

A spring 283 fastened to a pin carried by lever 281 and a spring 1283 attached to the end of an arm 284, mounted on the shaft 285, which supports the zero stop pawl 2112 for the balance bank, are for the purpose of normally maintaining the zero stop pawls in their effective positions.

When a key in the withdrawal bank is depressed, a subtraction is to be made from the adding and subtracting totalizer, and it is, therefore, desired to position this totalizer so that the subtracting elements 329 thereof are opposite the actuators 234. As the subtracting elements are normally in this position, all that is necessary is to cause the latch 2239 for the differential mechanism of the balance bank to be disconnected in the zero position. It is clear, therefore, that when one of the withdrawal keys is depressed, the zero stop pawl 2112 for the balance bank will not be disturbed, but will lie in the path of and disconnect the latch for the balance bank differential in the zero position and thereby, when the subtracting totalizer is rocked into engagement with the actuators 234, whatever amount has been set upon the keyboard will be added to the amount on the subtracting wheels 329 and subtracted from the amount on the adding wheels 330 of said adding and subtracting totalizer.

As above noted, on totalizing operations, mechanism is provided for rocking the zero stop pawl 2112 for the balance bank out of its normal effective position, and this mechanism will now be described.

As shown in Fig. 4, the total lever control plate 274 has a slot 300 formed therein, through which projects the pin 301, carried by one arm 302 of the lever loosely mounted on a stud 303 projecting from the side frame. Also loose on this stud is an arm 304, which has a cam slot 305 formed therein, through which projects a pin 306, carried by an arm 307, fast on a shaft 308 supported by the machine side frame. It can be seen that when the total lever 135 is moved either up or down, out of its normal adding position in which it is shown in Fig. 4, the conformation of the slot 300 is such as to rock the lever 302 counter-clockwise. This movement of the lever 302 rocks the arm 304 also counter-clockwise by means of a spring 309 between these members. The counter-clockwise movement of the arm 304, due to the shape of the cam slot 305 therein, will rock the arm 307 and shaft 308 in a clockwise direction.

Fast on the shaft 308 (Fig. 3), appropriate to the balance bank, is an arm 310, the end of which normally lies just above pin 311, carried by an arm 312, which is connected with the zero stop pawl 2112. It can be seen that when the shaft 308 is rocked clockwise, the arm 310 will also be rocked to a like extent, and will come into contact with the pin 311, and thereby, through the arm 312, rock the zero stop pawl 2112 in the balance bank to its ineffective position, in which position it will be held as long as the total lever remains out of its normal adding position. It has already been described how the latch 2239 of the balance bank is broken in the "fifth" or balance position on operations when the new balance is printed.

It will be noted that the latch of the balance bank may be disconnected in three different positions, (Fig. 3), all of which will select the adding side of the adding and subtracting totalizer, and it should be noted that this is made necessary by the fact that the machine is adapted to print in different columns, depending on the nature of the entry, and therefore, although the adding side of the totalizer is to be selected on each of these operations, the latch must be disconnected in a different position.

While the form of mechanism herein shown and described is admirably adapted to fulfill the object primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a plurality of differentially movable members, driving means for said members, means for disconnecting said differentially movable members from said driving means, and a plurality of different means for effecting said disconnection controlled by a single key.

2. In a machine of the class described, the combination of a plurality of differentially movable members, driving means for said members, means for disconnecting said differentially movable members from said driving means, and a single means for effecting said disconnection at different points in the movement of said driving means.

3. In a machine of the class described, the combination of two differentially movable members, a plurality of depressible keys appropriate to one of said members for arresting its movement, a stop adapted to arrest the other of said members in a predetermined position, and means operated by the depression of one of said keys for setting said stop.

4. In a machine of the class described, the combination of a plurality of differentially movable members, means for normally arresting the movement of all of said members in their zero positions, a plurality of keys adapted to cooperate with one of said members, and means operated by the depression of any of these keys for moving said zero arresting means for all of the differentially movable members to ineffective position.

5. In a cash register, the combination of a differentially movable member, a driving member therefor, means for latching said differentially movable member to said driving member, a member carried on the same axis as said differentially movable member, and means whereby the movement of said member to a certain position will subsequently cause the said latch to be disconnected.

6. In a machine of the class described, the combination of two differentially movable members, a plurality of depressible keys appropriate to one of said members for arresting its movement, a pin carried by one of said keys, a slotted arm cooperating with said pin, a second arm adapted to arrest the other of said members but normally in ineffective position, and a yoke connecting said first and second mentioned arms so that the depression of the key carrying the said pin will rock said second mentioned arm into position to arrest said second mentioned differentially movable member.

7. In a machine of the class described, the combination of two differentially movable members, zero stop pawls for normally arresting the movement of both of said members in their zero positions, a plurality of keys adapted to cooperate with one of said members, a detent bar moved by the depression of said keys, an arm to which said detent bar is pivoted, a pin on one of said zero stop pawls engaged by said arm so that when said detent bar is moved by the depression of a key, the zero stop pawl for this bank will be moved to ineffective position, and connections between this zero stop pawl and the other of said zero stop pawls so that both of them will be moved simultaneously to their ineffective positions.

In testimony whereof I affix my signature.

BERNIS M. SHIPLEY.